(No Model.)

G. W. CAMPBELL.
VEHICLE POLE TIP.

No. 441,352. Patented Nov. 25, 1890.

Witnesses.
A. Ruppert.
Frank H. Law

Inventor.
George W. Campbell
by Franklin H. Hough
his attorney

UNITED STATES PATENT OFFICE.

GEORGE W. CAMPBELL, OF LOWVILLE, NEW YORK.

VEHICLE POLE-TIP.

SPECIFICATION forming part of Letters Patent No. 441,352, dated November 25, 1890.

Application filed April 9, 1890. Serial No. 347,233. (No model.)

*To all whom it may concern:*

Be it known that I, GEORGE W. CAMPBELL, a citizen of the United States, residing at Lowville, in the county of Lewis and State of New York, have invented certain new and useful Improvements in Vehicle Pole-Tips; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in pole-tips; and it has for its object to improve in general this class of devices. I have found from experience that in practice the hooks on pole-tips are very apt to be broken by the dropping of the pole when the hook is open. I prevent the possibility of such accidents. I provide the hook with a projection so shaped that when the pole is on the wagon and the tip resting on the floor with the hook thrown open it rests on the projection, leaving from the projection to the back end of the hook a straight line of solid material capable of doing its work. In order to secure perfect safety and avoid the danger of accidental opening of the hook and to keep it always in a straight line, I provide the same with a pin at its point, which pin is designed to enter a hole in the under side of the tip.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1:
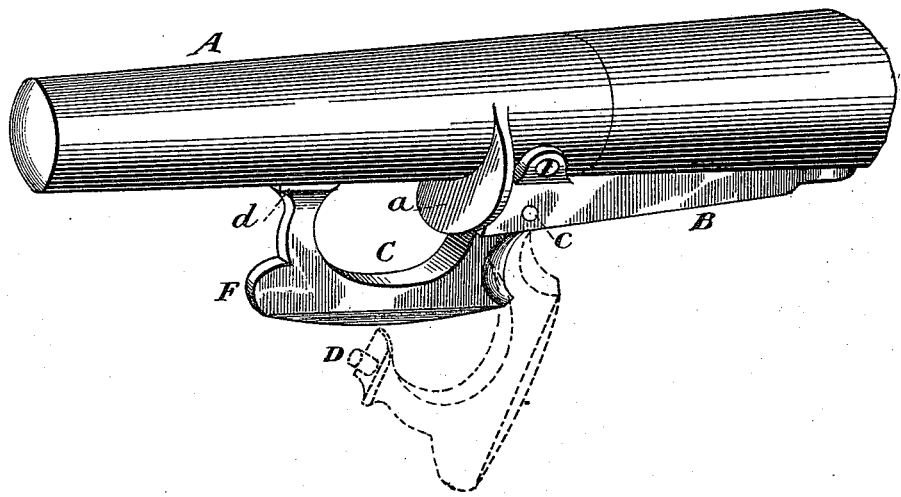
Figure 2:
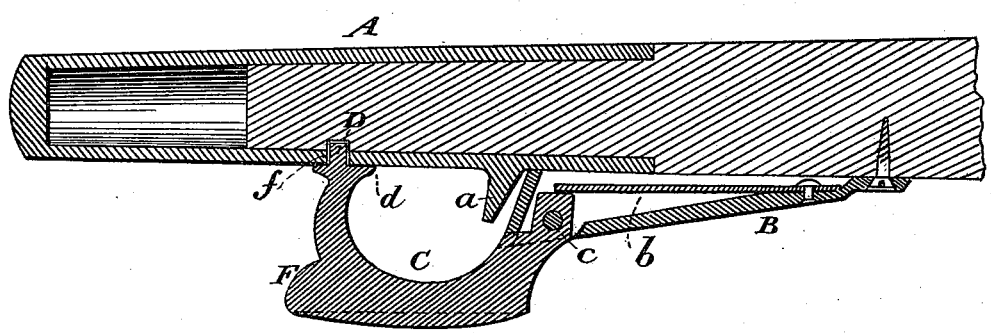

Figure 1 is a perspective view of my improved tip, showing also in dotted lines the hook thrown open. Fig. 2 is a longitudinal section through the same.

Like letters of reference indicate like parts throughout the two views.

I have shown in this application a construction of pole-tip which is not new with me, except as hereinafter specified; but such parts as are shown, but not claimed, may be varied within certain limits without detracting from the essence of the novel features which are claimed, the novelty in the present instance residing in the peculiarities of construction, as will be hereinafter more fully described, shown in the drawings, and then particularly pointed out in the claim.

Referring now to the details of the drawings by letter, A designates the tip, formed with the shoulder $a$ and with the casing or chamber B, within which is arranged the spring $b$, upon the outer end of which the inner end of the hook C bears, the said hook being pivoted on the transverse pivot or pin $c$, supported in the side walls of the said casing or chamber and adapted to operate in the usual manner. The outer end of the hook is formed with an enlargement $d$, concaved, as shown, to correspond with the curvature of the body of the tip, and projecting centrally from this enlarged portion is a pin D, which, when the hook is closed, fits within the hole $f$ in the under side of the body of the tip, as shown, and serves to keep the same from displacement in any direction. The spring serves to keep this firmly in place against the body of the tip with the pin in the hole. I form the front end of the hook with a projection F, which extends for some distance in a straight line, as seen in Figs. 1 and 2, and extends beyond its point of connection with the hook forward. This may be integral with the hook or formed separate and firmly affixed thereto, as preferred. It will be seen that should the pole be dropped upon the floor or ground with the hook open this projection will serve to prevent contact of the hook with the ground or floor, the hook resting on this projection and having a long bearing, as shown. This is especially advantageous in cold weather, when should the hook be dropped onto the ground with the hook open it would be very apt to be broken off, whereas with my construction such an accident would not occur. The projection serves, further, to prevent bending of the hook by repeated knocks upon the ground, and thus the hook is always made to retain its proper shape, and this is especially important when the pin is employed, for if the hook got bent out of shape the pin would not strike the hole when it was closed.

What I claim as new is—

As an improved article of manufacture, a pole-tip having its body portion formed with a hole upon its under side and a pivoted hook having at its outer end a pin adapted to engage said hole when the hook is closed, and with shoulders bearing against the body portion of the tip around said hole, substantially as and for the purpose specified.

In testimony whereof I affix my signature in presence of two witnesses.

GEORGE W. CAMPBELL.

Witnesses:
 JOHN B. MORSE,
 CHARLES S. MERENESS.